(No Model.)
J. CARNES.
STREET CAR GEARING.
No. 422,069. Patented Feb. 25, 1890.
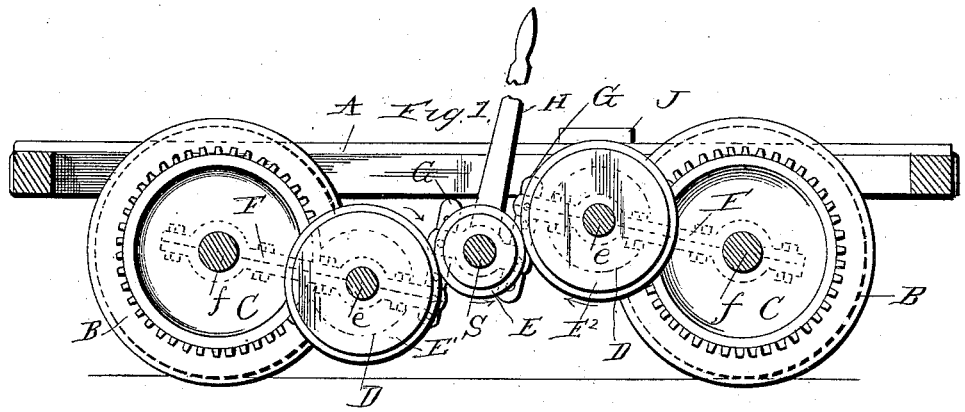
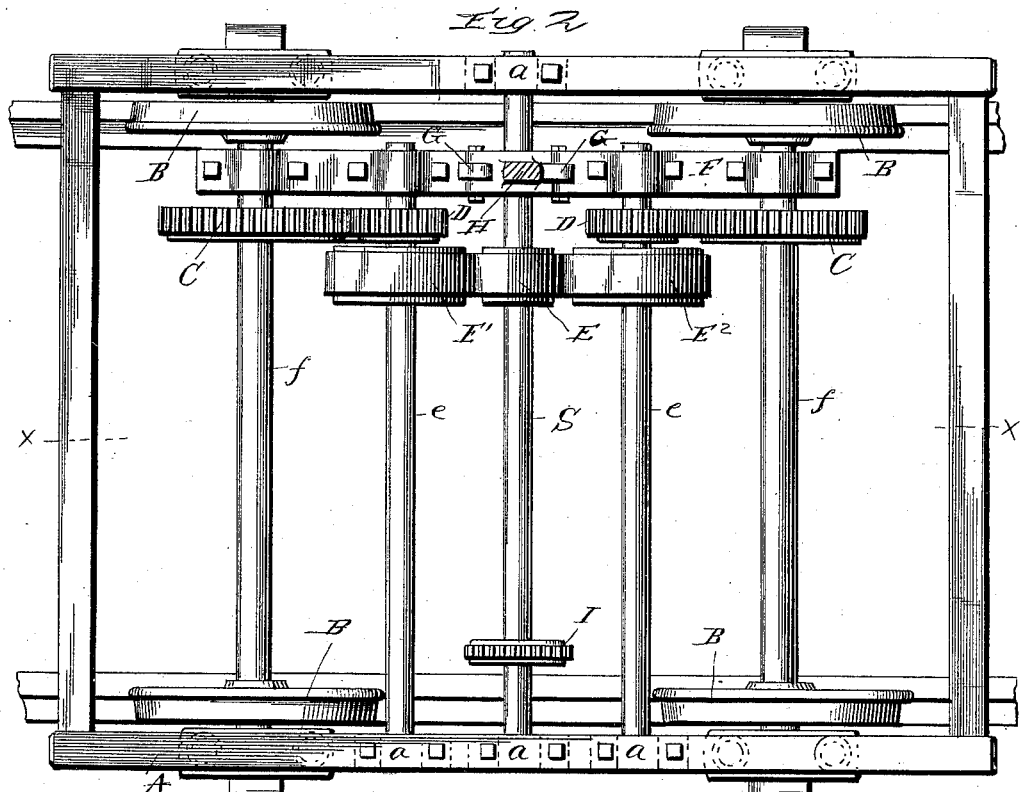
Witnesses
Inventor
John Carnes,
By C. D. Campbell
Attorney

UNITED STATES PATENT OFFICE.

JOHN CARNES, OF LIMA, OHIO.

STREET-CAR GEARING.

SPECIFICATION forming part of Letters Patent No. 422,069, dated February 25, 1890.

Application filed April 3, 1889. Serial No. 305,906. (No model.)

*To all whom it may concern:*

Be it known that I, JOHN CARNES, a citizen of the United States, and a resident of Lima, in the county of Allen and State of Ohio, have invented a new and useful Street-Car Gearing, of which the following is a specification.

My invention relates to improvements in street-car gearing.

Figure 1 is a side sectional view, and Fig. 2 a top view.

The object of my invention is to provide a combination-gear that will do away with the grinding noise made by all cars driven by motors, and to arrange the connecting parts so that they shall not be affected by the vibrations of the car, and to make all the wheels drivers.

My construction is as follows:

The shafts or axles $f\,f$ of the main wheels B B are mounted in journal-boxes underneath the main frame A in the usual manner. Mounted on these shafts, inside the frame, as shown in Fig. 2, are iron cog-wheels C, having projecting from their inner faces the friction-rims T.

Suspended from or journaled on the shafts $f\,f$ are connecting-arms F F, journaled in which are shafts $e\,e$, whose outer ends are journaled loosely in the frame A, and pivoted to the outer ends of the arms are the links G G, carrying and connected by the support or T-shaped lever H, in which is journaled the shaft S.

Mounted on the shafts $e\,e$ are the filled wooden cog-wheels D D, which mesh with the iron cog-wheels C C on the shafts $f\,f$, and having the wooden friction-rims V V, that bear against the iron friction-rims T T on the wheels C C and prevent the cogs on one wheel going to the bottom of the space between the teeth on the other wheel, and prevent the jarring motion of the cogs.

Mounted on the shafts $e\,e$ alongside of the wheels D D are iron friction-wheels $E'\,E^2$, that bear against the wooden friction-wheel E on the shaft S. The inner ends of shafts $e\,e$ are journaled in the connecting-arms F F, swung from the axles, while their outer ends are loosely journaled in the frame A in boxes large enough to allow the wheels $E'\,E^2$ to be thrown out of gear with wheel E, the inner end of the frame only moving from one-eighth to one-half an inch, and the outer end journaled in the frame moving almost an imperceptible distance.

The power from the motor may be applied to any of the shafts; but I prefer to apply it to shaft S; and to this end I mount a sprocket-wheel I on the shaft, over which the chain from the motor will pass. It will thus be seen that when the shaft S is revolved by power applied to the sprocket-wheel I the whole system of shafts is made to revolve by means of the friction and cog wheels, and all the wheels of the car are made drivers.

When it is desired to stop the car, the lever H is thrown back, raising the wheel $E^2$ from contact with wheel E and bringing it in contact with brake J. The same motion of the lever also drops wheel $E'$ out of contact with wheel E, and the car is stopped without stopping the motor or the revolution of the driving-shaft S.

The combination of the paper and iron cog-wheels, friction-wheels, and friction-rims does away with the disagreeable noise that is usually made by motor-cars, and the suspension of the working parts from the axles or shafts of the main wheels instead of from the frame prevents the vibration of the car proper from having any effect upon the gearing.

What I claim is—

1. The combination, with the driving-wheels of a car, of the driving-shaft and gearing suspended beneath the car-frame, the gear-wheels C being located on the axle-shafts, and the connecting-gearing being swung from the connecting-arms F, as and for the purpose set forth.

2. The combination, with the main wheels and axles of a car, of the running-gear swung from the connecting-arms free of the frame, as and for the purpose set forth.

3. The combination, with the gearing of a car, of the hand-lever H and brake J for stopping the car without stopping the revolution of the driving-shaft, as and for the purpose set forth.

4. The combination, with the driving-shaft S and friction-wheel E, of the friction-wheels $E'\,E^2$, cog-wheels D C, and friction-rims T V, as and for the purpose set forth.

JOHN CARNES.

Witnesses:
E. K. CAMPBELL,
NED CAMPBELL.